(12) United States Patent
Rose

(10) Patent No.: US 8,073,808 B2
(45) Date of Patent: Dec. 6, 2011

(54) SYSTEMS, METHODS, AND APPARATUS FOR AUTOMATIC IMAGE RECOGNITION

(75) Inventor: Geordie Rose, Burnaby (CA)

(73) Assignee: D-Wave Systems Inc., Burnaby (CA)

( * ) Notice: Subject to any disclaimer, the term of this patent is extended or adjusted under 35 U.S.C. 154(b) by 883 days.

(21) Appl. No.: 12/106,024

(22) Filed: Apr. 18, 2008

(65) Prior Publication Data
US 2008/0260257 A1 Oct. 23, 2008

Related U.S. Application Data

(60) Provisional application No. 60/912,904, filed on Apr. 19, 2007.

(51) Int. Cl.
*G06F 15/00* (2006.01)
*G06F 15/18* (2006.01)
(52) U.S. Cl. ........................................................ 706/62
(58) Field of Classification Search .................. 706/62
See application file for complete search history.

(56) References Cited

U.S. PATENT DOCUMENTS

| | | | |
|---|---|---|---|
| 6,838,694 B2 | 1/2005 | Esteve et al. | 257/34 |
| 7,135,701 B2 | 11/2006 | Amin et al. | 257/31 |
| 7,335,909 B2 | 2/2008 | Amin et al. | 257/34 |
| 7,533,068 B2 | 5/2009 | Maassen van den Brink et al. | 706/10 |
| 7,870,087 B2 | 1/2011 | Macready et al. | 706/62 |
| 2003/0108242 A1 | 6/2003 | Conant | 382/190 |
| 2005/0157952 A1* | 7/2005 | Gohda et al. | 382/305 |
| 2006/0147154 A1 | 7/2006 | Thom et al. | 385/37 |
| 2006/0225165 A1 | 10/2006 | Maassen van den Brink et al. | 977/933 |
| 2008/0116449 A1 | 5/2008 | Macready et al. | 257/31 |
| 2008/0176750 A1 | 7/2008 | Rose et al. | 505/170 |
| 2008/0215850 A1 | 9/2008 | Berkley et al. | 712/1 |
| 2008/0218519 A1 | 9/2008 | Coury et al. | 345/440 |
| 2008/0238531 A1 | 10/2008 | Harris | 327/528 |

FOREIGN PATENT DOCUMENTS

| WO | 2004/068300 | 8/2004 |
|---|---|---|
| WO | 2006/066415 | 6/2006 |

OTHER PUBLICATIONS

'Graph matching: theoretical foundations, algorithms, and applications': Bunke, Proc. Vision Interface, 2000, pp. 82-88.*
Childs 'Finding cliques by quantum adiabatic evolution' [online], [retrieved on Mar. 22, 2011]. Retrieved from the Internet <http://arxiv.org/abs/quant-ph/0012104>.*
'Quantum computing with superconductors': Berggren, 2004, IEEE, 0018-9219, pp. 1630-1638.*
"A High-Level Look at Optimization: Past, Present and Future," e-Optimization.Community, May 2000, pp. 1-5.
Beach et al., "Quantum Image Processing (QuIP)," Proceedings of the $32^{nd}$ Applied Imagery Pattern Recognition Workshop (AIPR'03), 2003, 6 pages.
Blatter et al., "Design aspects of superconducting-phase quantum bits," *Physical Review B* 63:174511-1-174511-9, 2001.

(Continued)

*Primary Examiner* — Omar Fernandez Rivas
*Assistant Examiner* — Peter Coughlan
(74) *Attorney, Agent, or Firm* — Seed IP Law Group PLLC

(57) ABSTRACT

A method of improving the accuracy and computation time of automatic image recognition by the implementation of association graphs and a quantum processor.

23 Claims, 6 Drawing Sheets

OTHER PUBLICATIONS

Boyer et al., "On the Cutting Edge: Simplified O(n) Planarity by Edge Addition," Journal of Graph Algorithms and Applications 8(3):241-273, 2004.

Choi, V., "Systems, Devices, and Methods for Analog Processing," U.S. Provisional Patent Application No. 60/986,554, filed Nov. 8, 2007, 39 pages.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Felzenszwalb et al., "Pictorial Structures for Object Recognition," International Journal of Computer Vision 61(6), 2005, 42 pages.

Feynman, "Simulating Physics with Computers," *International Journal of Theoretical Physics* 21(6/7):467-488, 1982.

Friedman et al., "Quantum superposition of distinct macroscopic states," *Nature* 406:43-46, Jul. 6, 2000.

Glover et al., "One-Pass Heuristics for Large-Scale Unconstrained Binary Quadratic Problems," University of Mississippi Technical Report HCES-09-00, available at http://hces.bus.olemiss.edu/reports/hces0900.pdf, 2000, 23 pages.

Il'ichev et al., "Continuous Monitoring of Rabi Oscillations in a Josephson Flux Qubit," *Physical Review Letters* 91(9):097906-1-097906-4, week ending Aug. 29, 2003.

International Search Report, mailed Aug. 1, 2008, for PCT/CA2008/000726, 5 pages.

Kynsh et al., "Adiabatic Quantum Computing in Systems with Constant Inter-Qubit Couplings," arXiv:quant-ph/0511131 v2, pp. 1-10, Nov. 15, 2005.

Makhlin et al., "Quantum-State Engineering with Josephson-Junction Devices," *Reviews of Modern Physics* 73(2):357-400, Apr. 2001.

Mooij et al., "Josephson Persistent-Current Qubit," *Science* 285:1036-1039, Aug. 13, 1999.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B* 60(22):15 398-15 413, Dec. 1, 1999.

Rose, "Systems, Methods, and Apparatus for Automatic Image Recognition," U.S. Provisional Patent Application No. 60/912,904, filed Apr. 19, 2007, 29 pages.

Rose, "Systems, Methods, and Apparatus for Recursive Quantum Computing Algorithms," U.S. Provisional Patent Application No. 60/943,519, filed Jun. 12, 2007, 46 pages.

Shor, "Introduction to Quantum Algorithms," AT&T Labs—Research, arXiv:quant-ph/0005003 v2, pp. 1-17, Jul. 6, 2001.

Tefas et al. "Face Authentication by Using Elastic Graph Matching and Support Vector Machines," IEEE International Conference on Acoustics, Speech, and Signal Processing, Istanbul, Turkey, Jun. 5-9, 2000, vol. 4, 4 pages.

Wiskott et al., "Face Recognition by Elastic Bunch Graph Matching," IEEE Transactions on Pattern Analyis and Machine Intelligence 19(7):775-779, 1997.

Wocjan et al., "Treating the Independent Set Problem by 2D Ising Interactions with Adiabatic Quantum Computing," arXiv:quant-ph/0302027 v1, pp. 1-13, Feb. 4, 2003.

Written Opinon, mailed Aug. 1, 2008, for PCT/CA2008/000726, 10 pages.

* cited by examiner

SYSTEMS, METHODS, AND APPARATUS FOR AUTOMATIC IMAGE RECOGNITION

CROSS REFERENCE TO RELATED APPLICATIONS

This application claims benefit under 37 C.F.R. 119(e) of U.S. Provisional Patent Application Ser. No. 60/912,904, filed Apr. 19, 2007, entitled "Systems, Methods, and Apparatus for Automatic Image Recognition", which is incorporated herein by reference in its entirety.

BACKGROUND

1. Field

The present systems, methods, and apparatus relate to the implementation of a quantum processor in the automatic recognition of an image, such as a facial image, from a database of images.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al.,"Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the |0> and |1> states. During quantum computation, the state of a qubit, in general, is a superposition of basis states so that the qubit has a nonzero probability of occupying the |0> basis state and a simultaneous nonzero probability of occupying the |1> basis state. Mathematically, a superposition of basis states means that the overall state of the qubit, which is denoted |Ψ>, has the form |Ψ>=a|0>+b|1>, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the |0> basis state or the |1> basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. Nos. 6,838,694 and 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, *Science* 285, 1036; and Orlando et al., 1999, *Phys. Rev.* B 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Effective Qubit

Throughout this specification and the appended claims, the terms "effective qubit" and "effective qubits" are used to denote a quantum system that may be represented as a two-level system. Those of skill in the relevant art will appreciate that two specific levels may be isolated from a multi-level quantum system and used as an effective qubit. Furthermore, the terms "effective qubit" and "effective qubits" are used to denote a quantum system comprising any number of devices that may be used to represent a single two-level system. For example, a plurality of individual qubits may be coupled together in such a way that the entire set, or a portion thereof, of coupled qubits represents a single two-level system.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, and U.S. Provisional Patent Application Ser. No. 60/986,554 filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use natural quantum fluctuations, such as quantum tunneling, to reach a global energy minimum more accurately or more quickly. It is known that the solution to a hard problem, such as a combinatorial optimization problem, may be encoded in the ground state of a system and therefore quantum annealing may be used to find the solution to such hard problems.

Adiabatic Quantum Computation

As mentioned previously, adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e=(1-s)H_i+sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. The coefficient s goes from 0 to 1, such that at the beginning of the evolution process the evolution Hamiltonian is equal to the initial Hamiltonian and at the end of the process the evolution Hamiltonian is equal to the final Hamiltonian. If the evolution is too fast, then the system can be excited to a higher state, such as the first excited state. In the present systems, methods, and apparatus, an "adiabatic" evolution is considered to be an evolution that satisfies the adiabatic condition, wherein the adiabatic condition is expressed as:

$$\dot{s}|<1|dH_e/ds|0>|=\delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally constant and slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Adiabatic quantum computation is a special case of quantum annealing for which the system begins and remains in its ground state throughout the evolution. Thus, those of skill in the art will appreciate that quantum annealing methods may generally be implemented on an adiabatic quantum computer, and vice versa. Throughout this specification, the term "adiabatic quantum computer" is used to describe a computing system that is designed to perform adiabatic quantum computations and/or quantum annealing.

Optimization Problems

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set (MIS), integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "A High-Level Look at Optimization: Past, Present, and Future" e-Optimization.com, 2000.

Many optimization problems are not solvable using UTMs. Because of this limitation, there is need in the art for computational devices capable of solving computational problems beyond the scope of UTMs. Classical digital computers are generally regarded as being unable to exceed the capabilities of UTMs, and accordingly, are subject to the limits of classical computing that impose unfavorable scaling between problem size and solution time. In accordance with the present systems, methods and apparatus, quantum adiabatic algorithms may be employed to obtain better solutions to these problems than can be achieved with classical optimization algorithms.

Graph Embedding

Graphs are an effective way of representing relationships among entities, and are commonly used in areas such as economics, mathematics, natural sciences and social sciences. While some graphs are simply used as a visual aid, others can be used to represent a problem to be solved. In fact, mapping a problem into graph format can sometimes help solve the problem. Instances of such problems include stock portfolio selection, microwave tower placement, delivery route optimization and other large-scale problems. Quantum computers can be used to solve such problems by way of translation of the original problem to a form that the quantum computer can solve. One method of doing this is through graph embedding, where a graph composed of a set of vertices and a set of edges that connect various vertices, representing a problem to be solved, is mapped into the qubit structure of a quantum processor and then solved.

Graph embedding involves defining a particular drawing of a graph by mapping every node, or vertex, to a point on a plane and every edge to a straight or curved line that connects two nodes. This drawing is not unique, as there can be many permutations of the same graph. The number of ways a graph can be embedded depends on the characteristics and rules of the grid system upon which they are drawn. For example, one grid system can be a two-dimensional lattice. The edges may, for example, be constrained to be in two mutually orthogonal directions (e.g., up-down or left-right). Such a grid system has a connectivity of 4, meaning that each node can have at maximum four edges connected to it, the edges going only in the directions mentioned above. A similar grid system wherein edges can also extend diagonally (e.g., at 45°) and where they can cross is of connectivity 8. One form of graph embedding involves taking a graph drawn on one grid system and drawing an equivalent graph on another grid system.

Graphs that can be embedded can be broken into two types: planar and non-planar. Planar graphs are graphs that can be embedded on a two-dimensional plane such that no two edges intersect. A non-planar graph is a graph where at least two edges intersect. Some forms of graph embedding involve embedding a planar graph into a non-planar graph or attempting to make a non-planar graph as planar as possible, i.e., by reducing the number of intersections. However, some non-planar graphs cannot be embedded into a planar graph. The most famous examples of such graphs are the graphs K5 and K(3, 3). More information on non-planar graphs and their embeddings can be found in Boyer et al., 2004, *Journal of Graph Algorithms and Applications* 8, pp. 241-273.

A technique of graph embedding into a lattice of qubits is described in Knysh et al., 2005, arXiv.org:quant-ph/0511131. Knysh describes a technique of mapping NP-complete problems into a lattice of qubits and performing adiabatic quantum computation to solve the problem. However, Knysh uses constant couplings between qubits and only nearest neighbor couplings, both of which reduce the flexibility and efficiency of the embedding and subsequent computation.

Further techniques of embedding graphs into a lattice of qubits are described in U.S. patent application Ser. No. 11/932,248.

Relational Databases

Many entities employ relational databases to store information. The information may be related to almost any aspect of business, government or individuals. For example, the information may be related to human resources, transportation, order placement or picking, warehousing, distribution, budgeting, oil exploration, surveying, polling, images, geographic maps, network topologies, identification, and/or security.

There are many alternative techniques of searching databases, though most approaches typically employ the preparation of one or more queries. For example, a technique is described in U.S. patent application Ser. No. 11/932,261, wherein a query is established in the form of a graph consisting of nodes and edges. In this technique, the entries in the database are used to generate database graphs, and each database graph is combined with the query graph to produce a set of association graphs. An association graph can then be used to evaluate the relation between the query graph and the corresponding database graph. In certain embodiments, an association graph is embedded onto a quantum processor comprising a set of qubits with the vertices of the association graph being represented by qubits and the edges of the association graph being represented by coupling devices between qubits. The qubits and coupling devices may be superconducting devices. The query corresponding to the association graph may be solved as a clique problem using the quantum processor. For example, the quantum processor may be evolved from a first or "initial" state to a second or "final" state, with the final state being representative of an arbitrary clique of the association graph or alternatively, a maximal clique or a maximum clique of the association graph. In certain embodiments, the query is best fulfilled by the database graph whose corresponding association graph produces the largest maximum clique.

Elastic Bunch Graph Matching

Elastic Bunch Graph Matching (EBGM) is a system for recognizing a single human face in a database of many unique facial images. Specifically, EBGM is a process by which an image of a human face is analyzed and a labeled graph representation is generated. The labeled graph representation is comprised of nodes and edges and is called an image graph. The nodes of the graph represent various "fiducial" points on the face (such as the eyes, nose, and mouth) and these nodes are weighted by sets of Gabor wavelet components called "jets." The edges of the graph represent relationships between fiducial points and the edges are labeled with two-dimensional distance vectors. Subsequent to the automatic generation of an image graph representation by EBGM, facial recognition may be accomplished by comparing the image graph of a query image with the respective image graphs of all images in a database.

The automatic generation of an image graph in EBGM is accomplished by aligning the facial image with a generalized "bunch" graph. The bunch graph is essentially a model grid for which each individual fiducial point is labeled with a set (or "bunch") of multiple jets rather than with one specific jet. The bunch graph overlays the facial image and the jet that best represents each fiducial point in the image is identified. The bunch graph therefore acts as a combinatorial entity, like a moldable mask. Edges in the bunch graph are sufficiently elastic that the resulting image graph may adapt to better fit the specific facial image. Initially, a bunch graph is defined manually and it grows in adaptability and accuracy as more and more facial images are incorporated into the bunch. More detailed descriptions of the process of EBGM may be found in Wiskott et al., *Face Recognition by Elastic Bunch Graph Matching*, IEEE Transactions on Pattern Analysis and Machine Intelligence, 19(7):775-779, 1997. An important point is that an increase in the accuracy of EBGM demands an increase in computational effort. For example, better accuracy may be obtained by increasing the number of fiducial points in a bunch graph. However, such an increase will demand greater computational effort in the EBGM image graph generation phase and lead to an image graph comprising a greater number of nodes and edges. Such a larger image graph demands more computational effort during the recognition phase when it is compared to all other image graphs in a database. As such, current techniques for automatic facial matching either do not produce the desired level of accuracy or they are too slow.

The problem of image matching is particularly well-suited to be solved on such quantum processors. Techniques of image recognition that are currently in practice are limited in their accuracy and are generally quite slow. Recognition accuracy depends on the accuracy of the graph representation, which itself ultimately depends on the number of image features identified. Traditionally, attempts to incorporate greater numbers of image features result in graph representations that are computationally exhaustive in the recognition process. Thus, some measure of accuracy is typically compromised to accommodate manageable computation times. By performing the recognition process on a quantum processor, recognition may be obtained with greater accuracy and/or more quickly than traditional methods.

BRIEF SUMMARY

At least one embodiment may be summarized as a computer-implemented method of identifying features of query images in a database of images, including comparing a graph representation of at least one feature of a query image to a respective graph representation of at least a portion of each of at least some of a plurality of database images of a database of images, wherein each comparison includes generating a respective association graph; and determining at least one characteristic of each association graph via a quantum processor, wherein the at least one characteristic of each association graph is representative of a similarity between the at least one feature of the query image and at least the portion of the respective database image to which the association graph corresponds.

The method may further include storing a result from the determining at least one characteristic of each association graph; and ranking the results such that the highest ranking result represents the most likely match between the feature of the query image and at least one of the database images. At least some of the plurality of database images may each include data representative of at least one human face, and wherein the feature of the query image may include data representative of at least one human face. The method may further include generating the respective graph representation of at least the portion of each of at least some of the database images of the database of images; and generating the graph representation of the at least one feature of the query image. Generating graph representations of at least the portion of each of at least some of the database image and of the at least one feature of the query image may include performing Elastic Bunch Graph Matching. Generating the respective graph representations of at least the portion of each database image may include generating the respective graph representations using a classical digital processor. Generating the graph representation of the at least one feature of the query image may include generating the graph representation using a classical digital processor. Determining at least one characteristic of each association graph may include determining a maximum independent set of each association graph. Determining at least one characteristic of each association graph may include determining a maximum clique of each association graph. Determining at least one characteristic of each association graph via a quantum processor may include determining at least one characteristic of each association graph via a superconducting quantum processor that comprises a plurality of superconducting qubits. The method may further include accessing the database of images via a classical digital processor. Generating the respective association graphs may include generating the respective associating graphs using a classical digital processor. The method may further include transmitting the respective association graphs from the classical digital processor to the quantum processor. The method may further include transmitting the at least one characteristic of each association graph that is determined by the quantum processor from the quantum processor to the classical digital processor. The method may further include examining at least a portion of the query image prior to comparing the graph representation of the query image with the graph representations of the database images; and identifying an aspect of the query image that is common to a subset of the database images, and wherein comparing a graph representation of the at least one feature of a query image to a respective graph representation of each of at least some of a plurality of database images may include comparing the graph representation of the at least one feature of the query image to only the graph representation of the databases images in the subset of the database images, with corresponding association graphs being produced therefor. The at least one feature of the query image may represent a majority of the query image. The similarity between the feature of the query image and the at least a portion of the respective database image to which the association graph corresponds may be indicative of whether or not the at least one feature of the query image occurs within the respective database image to which the association graph corresponds.

At least one embodiment may be summarized as a computer-implemented method of solving image matching problems, including casting an image matching problem as a quadratic unconstrained binary optimization problem; mapping the quadratic unconstrained binary optimization problem to a quantum processor; and evolving the quantum processor to produce a solution to the quadratic unconstrained binary optimization problem.

At least one embodiment may be summarized as a computer-implemented method of comparing two objects, including comparing a graph representation of at least a portion of a first object to a graph representation of at least a portion of a second object, wherein the comparison includes generating an association graph; and determining at least one characteristic of the association graph via a quantum processor, wherein the at least one characteristic of the association graph is representative of a similarity between the at least a portion of the first object and the at least a portion of the second object.

The method may further include the first object and the second object both being images. Determining at least one characteristic of the association graph may include determining a maximum independent set of the association graph. Determining at least one characteristic of the association graph may include determining a maximum clique of the association graph. Determining at least one characteristic of the association graph may result in the quantum processor returning a value that is representative of a measure of similarity between the at least a portion of the first object and the at least a portion of the second object.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
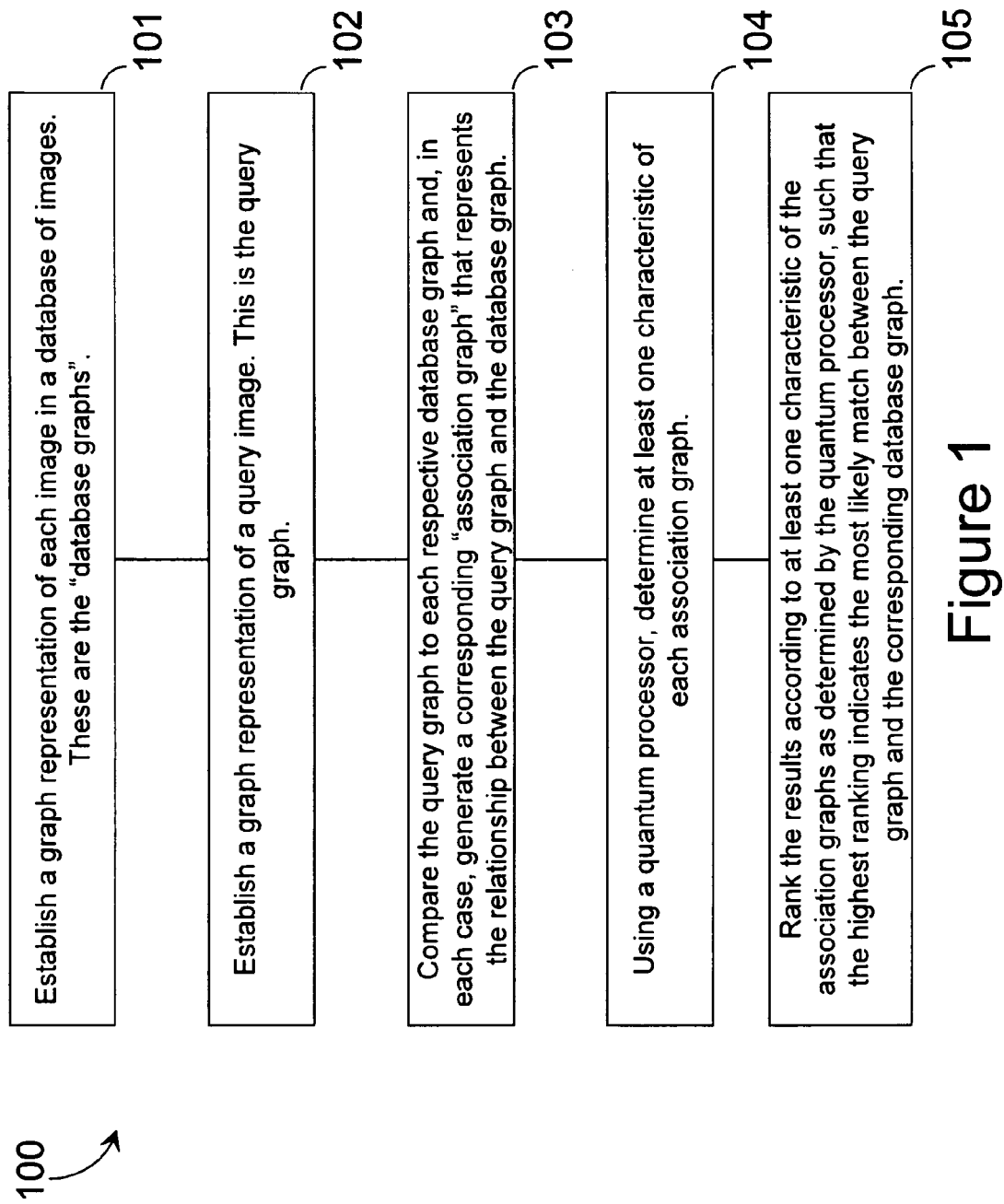
FIG. 1 is a flow-diagram of an embodiment of a method for performing automatic image recognition with a system comprising a quantum processor.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The present systems, methods, and apparatus describe techniques for implementing a quantum processor to perform automatic image recognition in a database of images. In order to do this, an image matching problem is mapped to a form that may be processed by a quantum processor. Images may take a variety of form. Typically, images take the form of digital information that can be used to produce a visual representation of the image, for instance on a display or on paper. The image may, for example, take the form of information that defines a bit map, for instance specifying intensities and/or colors for various pixels of a two dimensional array. Also for example, the image may take the form of a mathematical representation, for example one or more polynomial expressions (e.g., B-Spline polynomials) or vectors. Images may take other forms as well.

Image matching in its simplest form attempts to find pairs of image features from two images that correspond to the same physical structure. An image feature may, for example, include a vector that describes the neighborhood of a given image location. In order to find corresponding features, two factors are typically considered: feature similarity, as for instance determined by the scalar product between feature vectors, and geometric consistency. This latter factor is best defined when looking at rigid objects. In this case the feature displacements are not random but rather exhibit correlations brought about by a change in viewpoint. For instance, if the camera moves to the left, translation of the feature locations in the image to the right may be observed. If the object is deformable or articulatable then the feature displacements are not solely determined by the camera viewpoint, but neighboring features may still tend to move in a similar way. Thus, image matching can be cast as an optimization problem involving the minimization of an objective function that consists of at least two terms. The first term penalizes mismatches between features drawn from a first image and placed at corresponding locations in a second image. The second term enforces spatial consistency between neighboring matches by measuring the divergence between them. It has been shown in Felzenzwalb & Huttenlocher, "Pictorial Structures for Object Recognition," Intl. Journal of Computer Visions 61(1), 55-79 (2005) that this constitutes an NP-hard optimization problem.

In order to make an image matching problem amenable to a solution with a quantum algorithm, the image matching problem may be mapped to a quadratic unconstrained binary optimization ("QUBO") problem of the form:

$$\vec{x}_{opt} = \operatorname{argmin}\left\{\sum_{i \leq j=1}^{N} Q_{ij} x_i x_j\right\}, x_i \varepsilon \{0, 1\} \quad (1)$$

The binary optimization variables $x_i$, $x_j$ determine how features in one image map to features in another image. The coefficients $Q_{ij}$ are chosen so that minimization of the resultant objective function maximizes both feature similarity and geometric consistency. Equation (1) may be solved using a quantum computing algorithm, such as a quantum adiabatic algorithm.

A general method for implementing a quantum processor to solve the image matching problem is now provided. FIG. 1 is a flow-diagram that illustrates an embodiment of this method 100. Method 100 is a novel combination of three acts: generating graph representations of images 101 and 102 (e.g., electronic data or information representing visual images), pattern matching using association graphs 103, and solving a problem 104 using a system including a quantum processor. In act 101, graph representations of some or all of the images ("database images") in a database of images ("database graphs") are established. This may be done, for example, using a conventional (digital) processor. In act 102, a graph representation of a query image ("query graph") is established. In act 103, the query graph is compared to the database graphs and, for each comparison, a corresponding association graph is generated. In act 104, at least one characteristic of each association graph is determined using a quantum processor. In act 105, the results are ranked according to the at least one characteristic of the association graphs as determined by the quantum processor. The ranking may be established such that the highest ranking indicates the most likely match between the query graph and the corresponding database graph and hence between the query image and the corresponding database image.

In act 104, the characteristic or characteristics of the association graphs that may be determined by a quantum processor may depend on the type of images being examined or on the nature of recognition algorithm. Two appropriate characteristics include the Maximum Independent Set ("MIS") and the Maximum Clique ("MC") of the association graphs. These two characteristics are related and, as such, image recognition may be performed by determining only one of these two characteristics in each association graph. The MC of a graph is the largest subset of nodes that are all connected by edges. A larger MC in an association graph indicates a better match between the query graph and the corresponding database graph. Thus, the association graph that is determined to have the largest MC is expected to correspond to the most likely match between the query image and a database image. As an alternative to MC, MIS is the largest subset of nodes that do not share any edges, and therefore the association graph with the largest MIS will typically have the smallest MC. Thus, those of skill in the relevant art will appreciate that solving an MC problem is analogous to solving an MIS problem, the only difference being that the ranking order is inverted. Method 100 may be implemented to enhance the speed and/or the accuracy of automatic image recognition over the techniques that are currently in practice.

Method 100 may be applied to find a database image that matches a query image. However, method 100 may also be applied to find a database image that includes a specific feature that matches a specific feature that is included in a query image. The distinction here is that, in addition to matching whole images, method 100 may be applied to identify a feature in a query image and find a match to that feature in a database of images. For example, a query image may include a human face, and method 100 may be applied to find, within a database of images, a database image that includes a matching human face, even if the resulting database image includes a plurality of human faces where the matching face is only one feature of the database image. In such applications, some embodiments of method 100 may provide that the graph representation of the query image established in act 102 be limited to a graph representation of the specific feature of the query image for which a match is sought.

The present systems, methods, and apparatus describe the use of both a digital processor and a quantum processor in performing automatic image recognition. In some embodiments, the generation of graph representations of images (or specific features of images, depending on the desired query) and the generation of association graphs may be performed using a digital processor, while the determination of at least one characteristic of each association graph may be performed using a quantum processor.

Facial images are specific examples of a type of image that may be represented by graphs. The generation of graph representations of facial images is a field of study that continues to evolve and grow. The basic principle is that the relative positions of specific features on the face (such as the eyes, nose, and mouth, as well as many other more subtle features) may ultimately define a combination that is unique for each face. Thus, a graph representation of these relative positions may be used to identify an individual in much the same way as a fingerprint. In such a graph representation, the identifiable features (again, such as the eyes and mouth) may be represented by nodes or vertices that are connected by a web of edges. The edges may define the relative positions of the nodes. The greater the number of nodes (that is, the greater the number of features that are identified on an image) the better the accuracy of the graph representation. An identical or similar approach may be taken with respect to images that are representative of other body parts, for example iris or fingerprints.

Figure 2A:
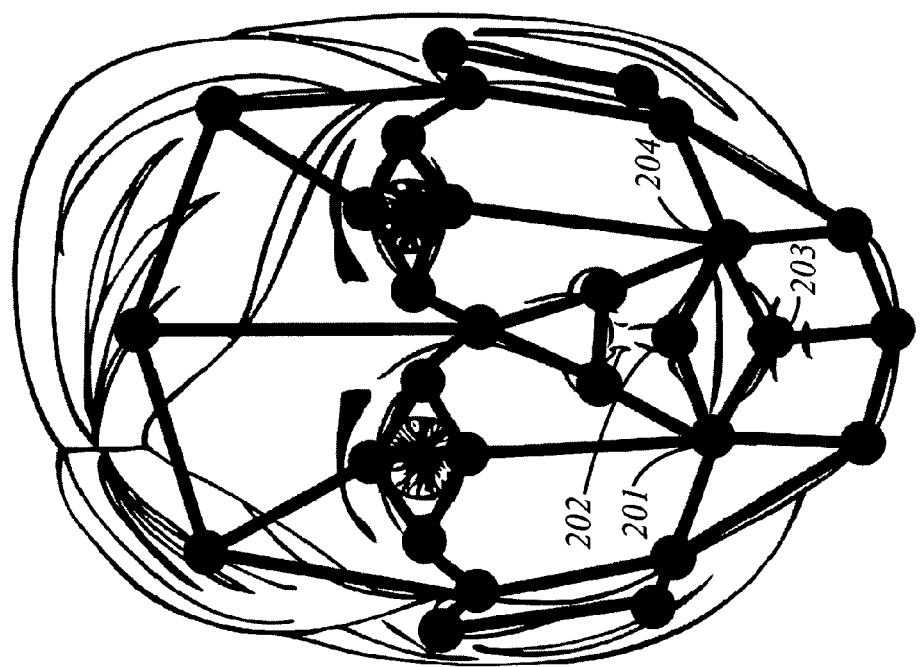
FIG. 2A is an illustrative diagram showing a graph representation of a facial image overlaying the facial image itself.

FIG. 2A is an illustrative diagram showing a graph representation 200 overlaying an original facial image. In FIG. 2A, nodes 201-204 define the outline of the mouth. For the sake of simplicity, graph representation 200 is made up of relatively few nodes (only four called out in the Figure) and is therefore a relatively inaccurate representation of the original facial image. However, those of ordinary skill in the art will appreciate that the accuracy of a graph representation of a facial image may be improved by increasing the number of nodes in the graph and thus representing more facial features in the image. Furthermore, FIG. 2A is meant to serve only as an illustrative example of a graph representation of a facial image. The specific facial features that are identified with nodes in FIG. 2A, and the corresponding edges between nodes, do not represent a required graph scheme. Those of skill in the art will appreciate that the specific facial features that are identified in a graph representation, as well as the corresponding network of edges between nodes, may vary according to the method by which the graph representation is generated. Those of skill in the art will also appreciate that the principles and techniques of generating graph representations of facial images may be applied to other image types, such as images of objects, landscapes, maps, fingerprints, etc. Thus, while FIG. 2A shows a graph representation of a facial image only, those of skill in the art will appreciate how graph representations of any type of images may similarly be established.

A graph representation of an image may be drawn manually, or it may be generated automatically. The ultimate goal of such graph representations is in image recognition, which may require that graph representations be established for every image in a very large database of images. As such, it is more practical to develop a system for automatically generating graph representations of images rather than drawing all by hand. An example of such a system is Elastic Bunch Graph Matching (EBGM). EBGM is specifically designed to be applied to facial images; however, the basic principles may be applied to images of any type. In EBGM, generalized model graphs are established which are then fit to new facial images and molded to create new graphs. The full details of this technique are described in Wiskott et al., *Face Recognition by Elastic Bunch Graph Matching*, IEEE Transactions on Pattern Analysis and Machine Intelligence, 19(7):775-779, 1997. A continuing challenge of this technique is the trade-off between accuracy and speed, since increasing the accuracy of a graph representation results in increased computational effort during the recognition process. However, by incorporating pattern matching using association graphs and then using a quantum processor to solve the resulting MIS problem, both accuracy and computation time may be improved beyond the techniques that are currently in practice.

EBGM is a leading technique in the automatic generation of graph representations of facial images. However, those of skill in the art will appreciate that the present systems, methods, and apparatus do not require that the graph representations be generated by EBGM. As previously discussed, the graph representations of facial images, or any other image type, may be generated manually or by using any other system, as long as there is enough consistency among the query and database graphs that meaningful association graphs may be generated.

For certain queries, it may be desirable to use a classical digital processor to identify certain key aspects of the query image that are automatically indicative of a certain subset in the database. For instance, while the graph representation of the query image is being generated, or from the graph representation before the association graph is generated, it may be possible to identify some aspect of the query image that immediately relates the query to some subset in the database. When such an identification is made, the query image need only be compared against those database images that share the same aspect and therefore fewer association graphs may be generated. Essentially, the database is filtered or pruned so that only those images that stand a chance of being recognized as a match are compared to produce association graphs. As an example, a query image may be initially categorized as relating to a human face, and a corresponding database of images may then be reduced to the subset of images that include at least one human face. Furthermore, in facial image recognition it may be possible to identify the race or sex of the facial image from the graph representation of the query image prior to comparison with the database images. In this example, the database to be examined would then be reduced to the subset of facial images that match the race or sex of the query image. This would require fewer association graphs to be generated, resulting in fewer calls to a quantum processor and reduced computation time. This preliminary filtering, or pruning, may be performed by a user or by the digital computer.

Those of skill in the relevant art will appreciate that a graph representation may be generated for any type of image. For example, images of objects, landscapes, maps, fingerprints, and constellations can all be represented by graphs. Furthermore, a graph representation may be generated for a specific feature of aspect of an image, rather than for the image as a whole.

Figure 2B:
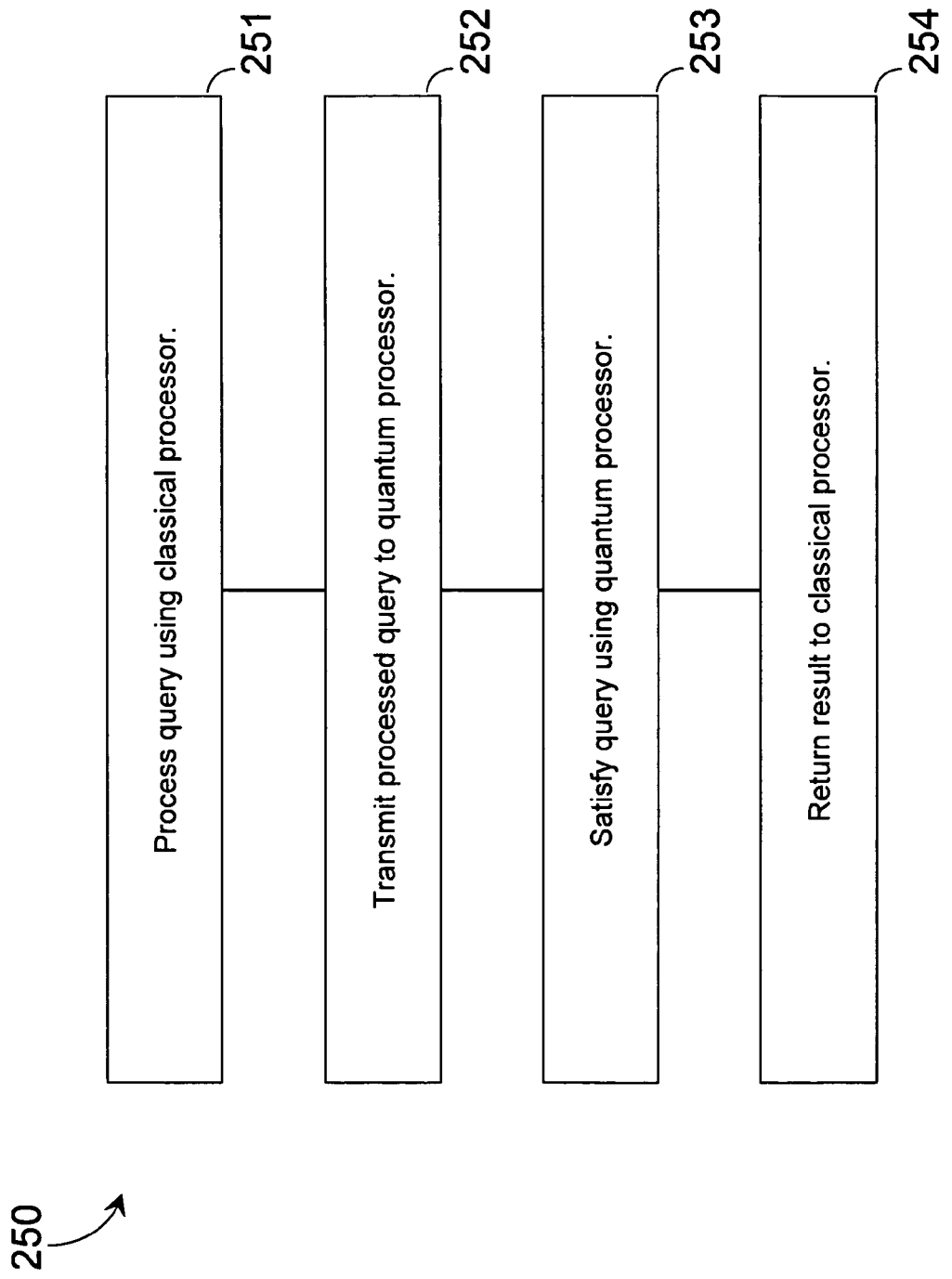
FIG. 2B is a flow-diagram of an embodiment of a method for communicating a problem from a classical processor to a quantum processor.

Throughout this specification and the appended claims, reference is made to communication between a classical processor and a quantum processor. For instance, association graphs may be generated using a classical processor as in act 103 of method 100, and a quantum processor may then be used to analyze the association graphs as in act 104 of method 100. FIG. 2B is a flow-diagram that illustrates an embodiment of a method 250 for communicating between a classical processor and a quantum processor. Method 250 includes four acts, 251-254. In act 251, a query is processed using a classical processor. The processing of a query may include a variety of actions, including but not limited to defining the parameters of a query, identifying a specific feature in a query image, generating association graphs, classifying a query, and establishing exit criteria. The processing of the query may also include converting the query into a form that may be transmitted to and managed by a quantum processor. In act 252, the processed query is transmitted from the classical processor to a quantum processor. In act 253, the quantum processor is used to satisfy the query. Satisfying a query may include a variety of processes, including but not limited to determining at least one feature (such as an MIS or MC) of an association graph. The quantum processor manages the query until the query is satisfied. In act 254, the result of satisfying the query is returned to the classical processor. This may include transmitting a result to the query from the quantum processor to a classical processor.

In accordance with the present systems, methods and apparatus, algorithms of adiabatic quantum computation and/or quantum annealing may be implemented in a heuristic fashion, wherein the requirement for global optimality in the solution is dropped. Using such algorithms, a quantum processor may provide: a) a more accurate solution in the same amount of time as a classical solving system, b) the same degree of accuracy in a shorter period of time than a classical solving system, or c) a more accurate solution in a shorter period of time than a classical solving system.

Adiabatic quantum computation, and similarly quantum annealing, may be implemented in a variety of different ways. Examples of particular implementations of adiabatic quantum computation are described in U.S. patent application Ser. No. 11/317,838 and Wocjan et al., 2003, "Treating the Independent Set Problem by 2D Ising Interactions with Adiabatic Quantum Computing," arXiv.org: quant-ph/0302027 (2003), pp. 1-13, where the qubit-coupling architecture is used to realize a 2-local Ising Hamiltonian with 1-local transverse field as given in equation 2:

$$H = \sum_{i=1}^{n} h_i \sigma_i^z + \sum_{i=1}^{n} \Delta_i \sigma_i^x + \sum_{i,j=1}^{n} J_{ij} \sigma_i^z \sigma_j^z \quad (2)$$

Here, n represents the number of qubits, $\sigma_i^z$ is the Pauli Z-matrix for the $i^{th}$ qubit, $\sigma_i^x$ is the Pauli X-matrix for the $i^{th}$ qubit, and $h_i$, $\Delta_i$ and $J_{ij}$ are dimensionless local fields coupled to each qubit. The $h_i$ terms in equation 2 may be physically realized by coupling signals or fields to the Z-basis of each $i^{th}$ qubit. The $\Delta_i$ terms in equation 2 may be physically realized by coupling signals or fields to the X-basis of each $i^{th}$ qubit. The $J_{ij}$ terms in equation 2 may be physically realized by coupling the Z-bases of pairs of qubits (qubits i and j, respectively) together.

Figure 3:
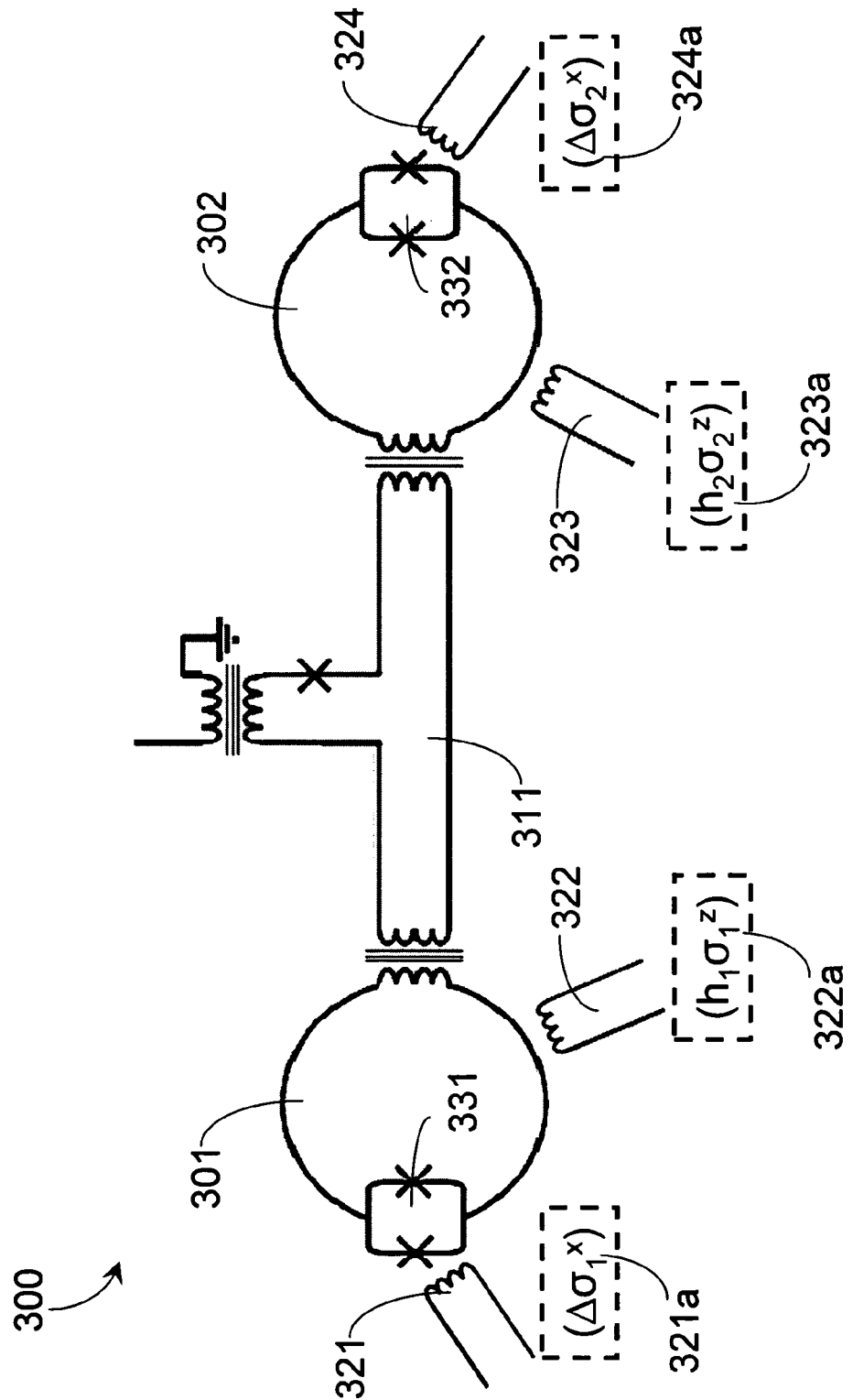
FIG. 3 is a schematic diagram of a portion of a conventional superconducting quantum processor designed for adiabatic quantum computation (and/or quantum annealing).

FIG. 3 is a schematic diagram of a portion of a conventional superconducting quantum processor 300 designed for adiabatic quantum computation (and/or quantum annealing). The portion of superconducting quantum processor 300 shown in FIG. 3 includes two superconducting qubits 301, 302 and a tunable ZZ-coupler 311 coupling information therebetween. While the portion of quantum processor 300 shown in FIG. 3 includes only two qubits 301, 302 and one coupler 311, those of skill in the art will appreciate that quantum processor 300 may include any number of qubits, and any number of coupling devices coupling information therebetween.

The portion of quantum processor 300 shown in FIG. 3 may be implemented to physically realize the Hamiltonian described by equation 2. In order to provide the $\sigma^z$ and $\sigma^x$ terms, quantum processor 300 includes programming interfaces 321-324 that are used to configure and control the state of quantum processor 300. Each of programming interfaces 321-324 may be realized by a respective inductive coupling, as illustrated, to a programming system (not shown). Such a programming system may be separate from quantum processor 300, or it may be included locally (i.e., on-chip with quantum processor 300) as described in U.S. patent application Ser. No. 11/950,276.

In the programming of quantum processor 300, programming interfaces 321 and 324 may each be used to couple a flux signal into a respective compound Josephson junction 331, 332 of qubits 301 and 302, thereby realizing the $\Delta_i$ terms in the system Hamiltonian. This coupling provides the $\sigma^x$ terms of equation 2. Similarly, programming interfaces 322 and 323 may each be used to couple a flux signal into a respective qubit loop of qubits 301 and 302, thereby realizing the $h_i$ terms in the system Hamiltonian. This coupling provides the $\sigma^z$ terms of equation 2. In FIG. 3, the contribution of each of programming interfaces 321-324 to the system Hamiltonian is indicated in boxes 321a-324a, respectively.

Those of skill in the art will appreciate that adiabatic quantum computation and/or quantum annealing may be achieved by implementing systems that differ from system 300 in FIG. 3, and/or by implementing Hamiltonians that differ from equation 2. System 300 and Hamiltonian 2 are intended to serve only as examples of embodiments of the present systems, methods and apparatus.

The present systems, methods and apparatus provide at least two modes of using a quantum processor to solve the image matching problem, where the preferred mode depends on the size of the problem (i.e., the number of vertices in the association graphs). In a first mode of operation, the "native mode", the problem size is small enough that the entire problem may be mapped directly to the quantum processor. In a second mode of operation, the "hybrid mode", the problem size is too large to be mapped directly to the quantum processor and, to compensate, the problem is decomposed into a set of smaller problems that may be mapped individually to the quantum processor.

In native mode operation, the image matching problem is mapped directly to the quantum processor. For any pair of images (i.e., a query image plus a database image) an association graph may be used to measure the similarity between the graph representations of the two images. Each vertex in an association graph may correspond to an association between a feature a in a first image and a feature β in a second image. Each edge in an association graph may encode some degree of geometric consistency between a pair of feature vectors in a first image and a pair of feature vectors in a second image. The MIS of an association graph provides both a similarity measure (the larger the MIS, the greater the region of mutual overlap) and the largest conflict-free mapping of features in the first image to features in the second image. As previously discussed, this technique may be used to match two whole images, or to find a specific feature from a query image in among a set of database images. For example, a "match" may be provided if all or a portion of a query image is contained somewhere within a corresponding database image. In accordance with the present systems, methods and apparatus, the problem of finding the MIS of an association graph may be cast as a QUBO problem by setting $Q_{ii}=-1$ for all vertices and $Q_{ij}=L$ whenever there is an edge between vertices. The minimum energy configuration of the QUBO problem enforces $x_i=1$ if and only if the corresponding vertex is an element of the MIS, otherwise $x_i=0$.

Figure 4:
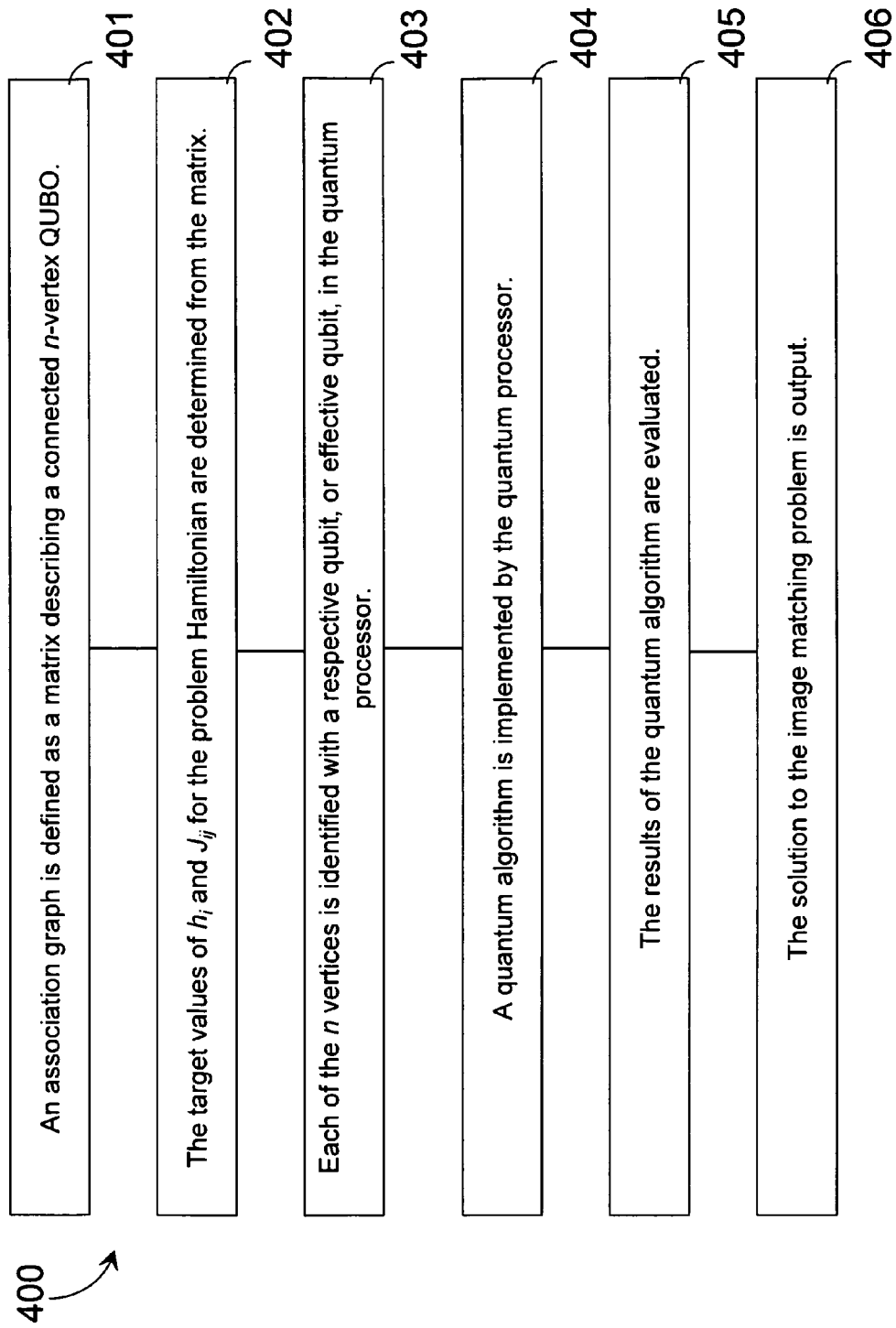
FIG. 4 is a flow-diagram of an embodiment of a method for a native mode of operation in solving an image matching problem with a quantum processor.

FIG. 4 is a flow-diagram of an embodiment of a method 400 for a native mode of operation in solving an image matching problem with a quantum processor. Method 400 provides more detail of the general method described by method 100 from FIG. 1. Specifically, method 400 provides an example of the acts used to perform act 104 of method 100 using a quantum processor similar to system 300 from FIG. 3 and implementing the Hamiltonian described by equation 2. In act 104 of method 100, a quantum processor is used to determine at least one characteristic of an association graph. Accordingly, in act 401 of method 400, the association graph is defined as a matrix Q describing a connected n-vertex QUBO, where n is limited by the number of qubits, or effective qubits, in the quantum processor. In act 402, the target values of $h_i$ and $J_{ij}$ from equation 2 are determined from the matrix Q. In act 403, each of the n vertices is identified with a respective qubit, or effective qubit, in the quantum processor. In act 404, a quantum algorithm is implemented by the quantum processor. This algorithm may include adiabatic quantum computation and/or quantum annealing by the application of appropriate time-dependent functions $h_i(t)$, $\Delta_i(t)$ and $J_{ij}(t)$. In act 405, the results of the quantum algorithm are evaluated. If the solution is not satisfactory then the method returns to act 404. If the solution is satisfactory then the method proceeds to act 406. In act 406, the solution to the image matching problem is output.

Method 400 described in FIG. 4 provides a procedure for determining the MIS (or, alternatively, the MC) of a single association graph. As described in method 100 of FIG. 1, in an image matching problem a set of association graphs may be generated, where each association graph corresponds to a respective comparison between the query image and a unique database image. Method 400 effectively provides a procedure for determining how good a match is achieved between the query image and a single database image. Thus, to solve an image matching problem it may be necessary to complete method 400 for each association graph and then to rank the results as in act 105 of method 100.

For many adiabatic quantum computing architectures, the number of physical qubits available is likely to be much less than the number of variables in the image matching problem to be solved (i.e., n>the number of qubits). Therefore, it may be necessary to decompose a large image matching problem into a set of smaller problems. In such instances, it may be necessary to implement a hybrid mode of operation where the complete image matching problem is decomposed into a set of smaller problems such that each of the smaller problems may be solved by the quantum processor. Those of skill in the art will appreciate that a wide variety of decomposition techniques may be implemented for this purpose. The present systems, methods and apparatus describe techniques for using the quantum processor to perform this decomposition by implementing a local search algorithm.

Figure 5:
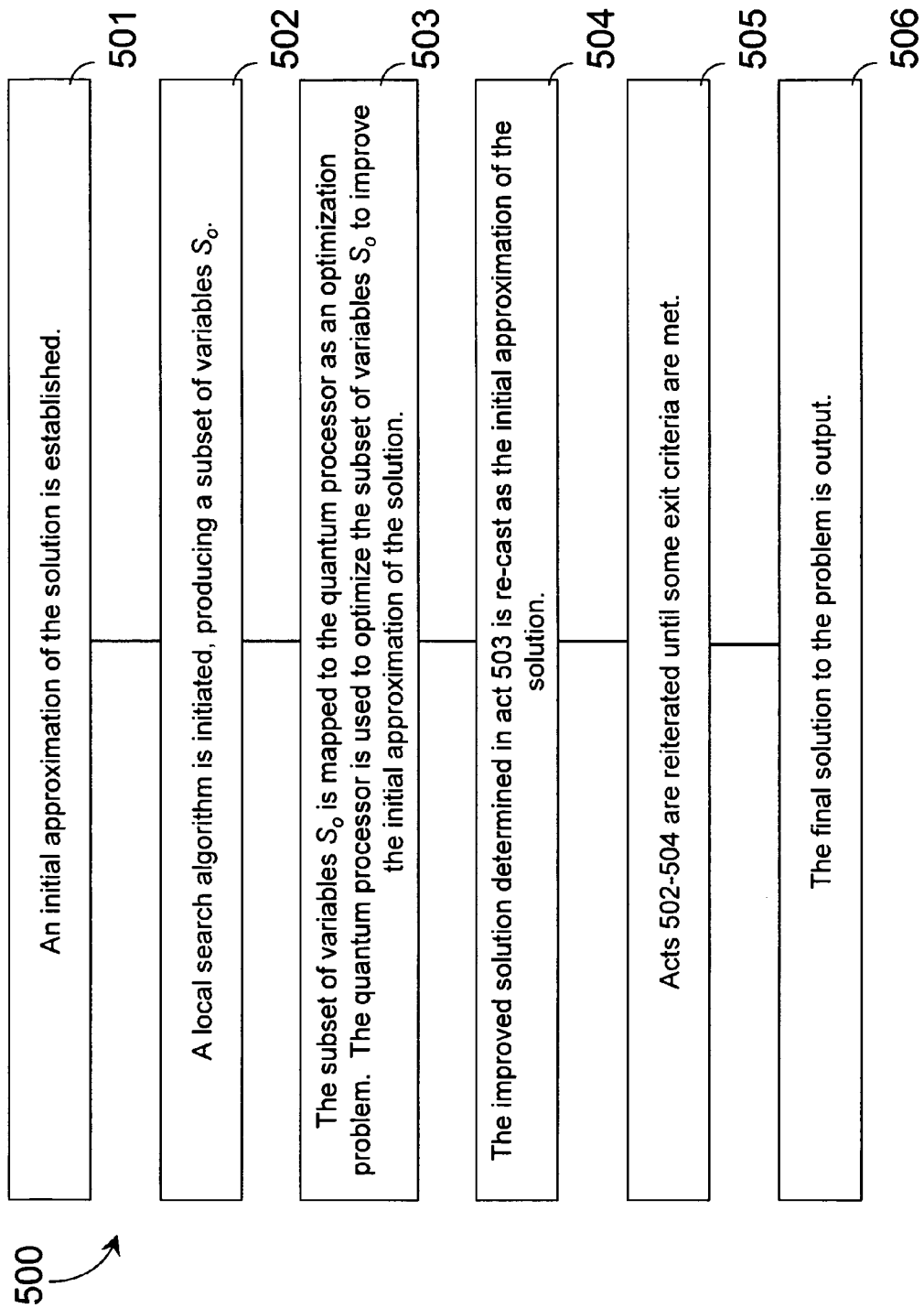
FIG. 5 is a flow-diagram of an embodiment of a method for a hybrid mode of operation in solving an image matching problem with a quantum processor.

FIG. 5 is a flow-diagram of an embodiment of a method 500 for a hybrid mode of operation in solving an image matching problem with a quantum processor. Similar to method 400 of FIG. 4, the goal of method 500 is to solve a QUBO problem, where the solution represents an MIS (or, alternatively, an MC) of an association graph. In act 501, an initial approximation of the solution is established using, for example, a classical heuristic solver. An example of an appropriate classical heuristic solver for QUBO problems is the Digest-Devour-Tidyup algorithm described in Glover et al., "One pass heuristics for large scale unconstrained binary quadratic problems," University of Mississippi Technical Report HCES-09-00 (2000), available at http://hces.bus.olemiss.edu/reports/hces0900.pdf, though those of skill in the art will appreciate that other classical heuristic solvers may alternatively be used. The initial approximation of the solution is used as the starting point of a local search algorithm. The initial approximation of the solution includes a set of variables $X_o$. In act 502, a local search algorithm is initiated by selecting a subset $S_o$ of the set of variables $X_o$. The number of variables in the subset $S_o$ is less than or equal to the number of variables that can be mapped directly to the quantum processor. In act 503, the subset of variables $S_o$ is mapped to the quantum processor as the optimization problem described in equation 3:

$$X_{S_o}^* = \mathrm{argmin}_{X_{S_o}} (X_{S_o}, X_{\setminus S_o} = X |_{S_o})$$

Thus, in act 503 the quantum processor is used to optimize the subset of variables $S_o$ to improve the initial approximation of the solution. In act 504, the improved solution determined in act 503 is re-cast as the initial approximation of the solution. In act 505, acts 502-504 are reiterated until some exit criteria are met. Examples of suitable exit criteria include, but are not limited to, a specified number of iterations, a specified amount of time, and/or a specified degree of accuracy. In act 506, the final solution to the problem is output. A recursive technique for quantum computation is described in U.S. Provisional Patent Application Ser. No. 60/943,519, filed Jun. 12, 2007 and entitled "Systems, Methods, and Apparatus for Recursive Quantum Computing Algorithms."

A potential disadvantage of method 500 is that it may only locate a local minimum within the space of the subset of variables $S_o$, rather than a global minimum in the space of all variables $X_o$. In accordance with the present systems, methods and apparatus, the local search algorithm of method 500 may be implemented in a tabu search heuristic to assist in escaping local minima. Each iteration of a tabu search (as is known in the art) stores and recalls the results of previous iterations. Thus, in some embodiments, as method 500 is implemented the results from each iteration may be stored. These stored results may include data relating to the effects of changing each single variable, thereby associating a cost with changing each variable. In each successive iteration, the algorithm may select a to adjust a variable that has not yet been changed, thereby producing a new entry in the stored data. This stored data then provides insight into the gradient of the solution landscape such that subsequent iterations may move towards the "best" local minima or, ideally, the global minimum.

Those of skill in the art will appreciate that through this specification the term "solve" is used to encompass both exact solutions and approximate solutions.

As described, the present systems, methods and apparatus may be used for image matching. This application may include matching two whole images, or it may include finding, within a database of images, a database image that contains all or a portion of a query image. For example, a query image may contain a road sign and it may be desired to find, within a database of images, a database image that includes a matching road sign somewhere therein. However, the concepts taught in the present systems, methods and apparatus may be applied to a much broader set of problems. A wide range of applications exist for which it is desirable to find a match to a query within a database. In some embodiments, the present systems, methods and apparatus may be generalized as a method of determining a measure of similarity between two objects, where features of the two objects are combined into an association graph that is analyzed by a quantum processor. The quantum processor may analyze the association graph and return a value that is indicative of a measure of similarity between the two objects. In some applications, the two objects may be images, such as a query image and a database image. However, in other applications, the two objects may take on other forms. For example, some embodiments may provide matching a query among the entries in a relational database. Other embodiments may provide pattern matching in other forms, such as but not limited to audio pattern matching, DNA sequence matching, and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and nonpatent publications referred to in this specification and/or listed in the Application Data Sheet, including but not limited to U.S. Provisional Patent Application Ser. No. 60/912,904, filed Apr. 19, 2007, entitled "Systems, Methods and Apparatus for Automatic Image Recognition," U.S. Pat. Nos. 6,838,694, 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. Pat. No. 7,135,701, U.S. patent application Ser. Nos. 11/932,248, 11/932,261, 11/317,838, 11/950,276, and U.S. Provisional Patent Application Ser. No. 60/943,519, filed Jun. 12, 2007 and entitled "Systems, Methods, and Apparatus for Recursive Quantum Computing Algorithms" are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of identifying features of query images in a database of images, the method comprising:
    comparing a graph representation of at least one feature of a query image to a respective graph representation of at least a portion of each of at least some of a plurality of database images of a database of images, wherein each comparison includes generating a respective association graph; and
    determining at least one characteristic of each association graph via a quantum processor, wherein the at least one characteristic of each association graph is representative of a similarity between the at least one feature of the query image and at least the portion of the respective database image to which the association graph corresponds.

2. The method of claim 1, further comprising:
    storing a result from the determining at least one characteristic of each association graph; and
    ranking the results such that the highest ranking result represents the most likely match between the feature of the query image and at least one of the database images.

3. The method of claim 1 wherein at least some of the plurality of database images each include data representative of at least one human face, and wherein the feature of the query image includes data representative of at least one human face.

4. The method of claim 1, further comprising:
    generating the respective graph representation of at least the portion of each of at least some of the database images of the database of images; and
    generating the graph representation of the at least one feature of the query image.

5. The method of claim 4 wherein generating graph representations of at least the portion of each of at least some of the database image and of the at least one feature of the query image includes performing Elastic Bunch Graph Matching.

6. The method of claim 4 wherein generating the respective graph representations of at least the portion of each database image includes generating the respective graph representations using a classical digital processor.

7. The method of claim 4, and wherein generating the graph representation of the at least one feature of the query image includes generating the graph representation using a classical digital processor.

8. The method of claim 1 wherein determining at least one characteristic of each association graph includes determining a maximum independent set of each association graph.

9. The method of claim 1 wherein determining at least one characteristic of each association graph includes determining a maximum clique of each association graph.

10. The method of claim 1 wherein determining at least one characteristic of each association graph via a quantum processor includes determining at least one characteristic of each association graph via a superconducting quantum processor that comprises a plurality of superconducting qubits.

11. The method of claim 10, further comprising:
    transmitting the respective association graphs from the classical digital processor to the quantum processor.

12. The method of claim 11, further comprising:
    transmitting the at least one characteristic of each association graph that is determined by the quantum processor from the quantum processor to the classical digital processor.

13. The method of claim 1, further comprising:
    accessing the database of images via a classical digital processor.

14. The method of claim 1 wherein generating the respective association graphs includes generating the respective associating graphs using a classical digital processor.

15. The method of claim 1, further comprising:
    examining at least a portion of the query image prior to comparing the graph representation of the query image with the graph representations of the database images; and
    identifying an aspect of the query image that is common to a subset of the database images, and wherein comparing a graph representation of the at least one feature of a query image to a respective graph representation of each of at least some of a plurality of database images includes comparing the graph representation of the at least one feature of the query image to only the graph representation of the databases images in the subset of the database images, with corresponding association graphs being produced therefor.

16. The method of claim 1 wherein the at least one feature of the query image represents a majority of the query image.

17. The method of claim 1 wherein the similarity between the feature of the query image and the at least a portion of the respective database image to which the association graph corresponds is indicative of whether or not the at least one feature of the query image occurs within the respective database image to which the association graph corresponds.

18. A computer-implemented method of solving image matching problems, the method comprising:
casting an image matching problem as a quadratic unconstrained binary optimization problem;
mapping the quadratic unconstrained binary optimization problem to a quantum processor; and
evolving the quantum processor to produce a solution to the quadratic unconstrained binary optimization problem.

19. A computer-implemented method of comparing two objects, the method comprising:
comparing a graph representation of at least a portion of a first object to a graph representation of at least a portion of a second object, wherein the comparison includes generating an association graph; and
determining at least one characteristic of the association graph via a quantum processor, wherein the at least one characteristic of the association graph is representative of a similarity between the at least a portion of the first object and the at least a portion of the second object.

20. The method of claim 19 wherein the first object and the second object are both images.

21. The method of claim 19 wherein determining at least one characteristic of the association graph includes determining a maximum independent set of the association graph.

22. The method of claim 19 wherein determining at least one characteristic of the association graph includes determining a maximum clique of the association graph.

23. The method of claim 19 determining at least one characteristic of the association graph results in the quantum processor returning a value that is representative of a measure of similarity between the at least a portion of the first object and the at least a portion of the second object.

* * * * *